(12) United States Patent
Saito et al.

(10) Patent No.: US 9,711,040 B2
(45) Date of Patent: Jul. 18, 2017

(54) WIRELESS CONTROL TERMINAL, WIRELESS CONTROL APPARATUS FOR CONTROLLING CONTROL TARGET, AND EMERGENCY STOP CONTROL PROGRAM

(71) Applicant: OMRON Corporation, Kyoto-shi, Kyoto (JP)

(72) Inventors: Keisuke Saito, Suita (JP); Hajime Umeki, Kyoto (JP); Daichi Ueki, Nara (JP); Tetsuji Yamato, Kyoto (JP)

(73) Assignee: OMRON Corporation, Kyoto-shi (JP)

( * ) Notice: Subject to any disclaimer, the term of this patent is extended or adjusted under 35 U.S.C. 154(b) by 0 days.

(21) Appl. No.: 15/118,993

(22) PCT Filed: Feb. 26, 2015

(86) PCT No.: PCT/JP2015/055581
§ 371 (c)(1),
(2) Date: Aug. 15, 2016

(87) PCT Pub. No.: WO2015/137135
PCT Pub. Date: Sep. 17, 2015

(65) Prior Publication Data
US 2016/0379482 A1 Dec. 29, 2016

(30) Foreign Application Priority Data

Mar. 14, 2014 (JP) .................................. 2014-051627

(51) Int. Cl.
*G05B 9/00* (2006.01)
*G08C 17/02* (2006.01)
(Continued)

(52) U.S. Cl.
CPC ............... *G08C 17/02* (2013.01); *G06F 1/28* (2013.01); *G06F 1/30* (2013.01); *H04Q 9/00* (2013.01); *G08C 2201/11* (2013.01)

(58) Field of Classification Search
CPC ............ G08C 2201/10; G08C 2201/11; G08C 2201/112; G08C 2201/114;
(Continued)

(56) References Cited

U.S. PATENT DOCUMENTS

| 8,032,253 B2* | 10/2011 | Nagata | B25J 19/06 180/2.1 |
| 2007/0297890 A1* | 12/2007 | Sjoberg | B25J 13/065 414/735 |

(Continued)

FOREIGN PATENT DOCUMENTS

| JP | 2011-224777 A | 11/2011 |
| JP | 2013-168703 A | 8/2013 |

*Primary Examiner* — Carlos E Garcia
(74) *Attorney, Agent, or Firm* — Mots Law, PLLC

(57) ABSTRACT

In a wireless control terminal configured to control a control target connected to a control apparatus by working in cooperation with a wireless assistant terminal capable of transmitting a predetermined control instruction for controlling the control target to the control apparatus by using a predetermined control wireless scheme with supply of power from a battery included in the wireless assistant terminal, a wireless control terminal-side battery is provided within the wireless control terminal so as to supply driving power required for control regarding emergency stop of the control target performed with a predetermined wireless scheme of the wireless control terminal. At least remaining storage power information regarding a remaining amount of storage power in the wireless control terminal-side battery is output to a notification apparatus provided in the wireless control terminal or the wireless assistant terminal.

9 Claims, 5 Drawing Sheets

(51) Int. Cl.
*G06F 1/30* (2006.01)
*G06F 1/28* (2006.01)
*H04Q 9/00* (2006.01)

(58) Field of Classification Search
CPC ......... G08C 2201/12; G06F 1/28; G06F 1/30;
G06F 1/305; G06F 1/3206; G06F 1/32;
H04Q 1/032
USPC .................................. 340/7.37, 693.1–693.3
See application file for complete search history.

(56) References Cited

U.S. PATENT DOCUMENTS

| | | | |
|---|---|---|---|
| 2009/0088898 A1* | 4/2009 | Nihei ......................... | B25J 5/02 |
| | | | 700/253 |
| 2009/0212905 A1* | 8/2009 | Batz ..................... | B60G 17/017 |
| | | | 340/5.54 |
| 2011/0010006 A1* | 1/2011 | Tani ....................... | B25J 9/1674 |
| | | | 700/245 |

* cited by examiner

WIRELESS CONTROL TERMINAL, WIRELESS CONTROL APPARATUS FOR CONTROLLING CONTROL TARGET, AND EMERGENCY STOP CONTROL PROGRAM

TECHNICAL FIELD

The present invention relates to a wireless control apparatus for controlling a control target wirelessly, and a wireless control terminal that is part of the wireless control apparatus.

RELATED ART

Many industrial robots, machine tools and the like are installed in production sites such as plants and factories. In order to control such machinery, control apparatuses are made wireless so as to meet the demand to allow operators to perform operation and maintenance in a cableless manner. According to, for example, the technique disclosed in Patent Document 1, ease of operation of operators is improved by wirelessly coupling a teach pendant for teaching an industrial robot and a controller for controlling the industrial robot. With this technique, a switch control ladder portion is provided on the controller, the switch control ladder portion being configured to issue a power interrupt instruction to a servodriver provided in the robot if an unintended robot operation is performed due to misoperation by an operator.

With a control apparatus configured to be wireless, the power for driving the wireless control apparatus is basically derived from a battery disposed within the control apparatus. Accordingly, the time for driving the wireless control apparatus is limited to the time during which power supply is received from the battery. For this reason, there is a wide demand to save power in an apparatus that receives a limited supply of power from the outside such as the above-described wireless control apparatus. For example, Patent Document 2 discloses a power saving technique when images are displayed on a mobile terminal that receives a limited supply of power from the outside.

RELATED ART DOCUMENTS

Patent Documents

Patent Document 1: JP 2011-224777A
Patent Document 2: JP 2013-168703A

SUMMARY OF THE INVENTION

Problem to be Solved by the Invention

In consideration of the demand to allow operators to perform operation and maintenance in a cableless manner, by configuring control apparatuses for controlling industrial robots, machine tools and the like to be wireless, the mobility can be improved significantly and very high practical utility can be achieved. On the other hand, operators may be in and out of the space where such industrial robots, machine tools and the like are installed, so as to perform operation. For this reason, in order to ensure the security of operators in the event of an unexpected situation, the control apparatuses are required to include an emergency stop apparatus for issuing an emergency stop instruction to the industrial robots and the like from the viewpoint of conforming to safety standards. For this reason, wireless control apparatuses need to be designed exclusively, which inevitably increases the cost of production to produce the wireless control apparatuses. Under the circumstances, in order to reduce the cost of wireless control apparatuses, a configuration has been proposed for a wireless control apparatus in which a recently widely used wireless terminal, such as a tablet, that has a wireless function is used in an assisting manner. However, even with a wireless control apparatus equipped with such a wireless assistant terminal, as described above, the configuration of an emergency stop apparatus relating to security needs to conform to the specified standards.

The wireless control apparatus, which is made cableless, needs to receive, as the driving power, supply of power from a battery provided within the wireless control apparatus. However, such an internal battery of course has a limited amount of power supply, and thus the time during which the wireless control apparatus can be used is limited unless the battery is charged or replaced with a new one. If the driving power of the wireless control apparatus becomes insufficient, the operations of the industrial robot and the like and emergency stop performed by the emergency stop apparatus cannot be implemented. That is, in the case of a configuration in which emergency stop performed by the emergency stop apparatus is released only while power is supplied, there is a possibility that the industrial robot and the like may unintentionally stop due to insufficient power from the battery. Also, in the case of a configuration in which power is required to implement emergency stop performed by the emergency stop apparatus, due to the insufficient power from the battery, it may not be possible to stop the industrial robot and the like according to the intension of the operator, which is not preferred for security reasons. As described above, as a result of configuring a control apparatus to be wireless, insufficient driving power in the wireless control apparatus is a very important issue.

The present invention has been made in view of the problems described above, and it is an object of the present invention to prevent an influence caused by insufficient driving power in a wireless control apparatus for controlling a control target such as an industrial robot, the wireless control apparatus including a wireless assistant terminal.

Means for Solving the Problems

In order to solve the above-described problems, the present invention uses, in a wireless control apparatus that uses a wireless assistant terminal, a configuration in which information regarding a remaining amount of storage power in a battery that supplies driving power to an emergency stop control portion that performs emergency stop control is output to a notification apparatus provided in the wireless control apparatus. By outputting the state of supply of driving power from the battery to the notification apparatus, the driving power being for emergency stop of a control target, as described above, the operator of the wireless control apparatus can recognize how long the operator can use the wireless control apparatus, and a situation can be avoided in which it becomes unexpectedly difficult to control the control target.

To be specific, the present invention relates to a wireless control terminal configured to control a control target connected to a control apparatus by working in cooperation with a wireless assistant terminal capable of transmitting a predetermined control instruction for controlling the control target to the control apparatus by using a predetermined control wireless scheme with supply of power from a battery included in the wireless assistant terminal. The wireless control terminal includes: an accommodation portion in which the wireless assistant terminal is accommodated, wherein the wireless assistant terminal and the wireless control terminal are placed in a state of being capable of performing electrical exchange of information with each other when the wireless assistant terminal is accommodated in the accommodation portion; an emergency stop control portion that performs, on the control apparatus, control regarding emergency stop of the control target by using a predetermined wireless scheme of the wireless control terminal; a wireless control terminal-side battery disposed within the wireless control terminal so as to supply driving power required to drive at least the emergency stop control portion in the wireless control terminal; and an output portion that outputs at least remaining storage power information regarding a remaining amount of storage power in the wireless control terminal-side battery to a notification apparatus provided in the wireless control terminal or the wireless assistant terminal.

The wireless control terminal according to the present invention functions as, for example, a wireless control apparatus for controlling a control target by working in cooperation with a wireless assistant terminal. The wireless control apparatus controls the control target by performing wireless communication with a control apparatus to which the control target is connected. The control target may be, for example, an apparatus such as an industrial robot or a machine tool, but the control target may be anything other than these apparatuses. Also, although various control manners of controlling the control target by the control manners can be used, the control manner includes at least control regarding emergency stop for the control target and control different from the emergency stop control.

The wireless assistant terminal is internally provided with a battery that supplies power required to drive the wireless assistant terminal, and with the use of the power supplied, a predetermined control instruction for the control target is transmitted to the control apparatus in a predetermined control wireless scheme. As the wireless assistant terminal, for example, a versatile tablet apparatus or the like can be used. In the tablet apparatus, a predetermined control instruction for the control target may be created and transmitted by an application program executed in the tablet apparatus. There is no particular limitation on the content of the predetermined control instruction as long as it is for control other than the control regarding emergency stop by the wireless control terminal. Also, the predetermined control wireless scheme may be any wireless scheme as long as the predetermined control instruction can be transmitted. For example, the predetermined control wireless scheme may be any type of scheme of Wi-Fi® supported by the wireless assistant terminal (wireless communication scheme that uses IEEE 802.11 standards).

On the other hand, the wireless control terminal according to the present invention can wirelessly control the control target by working in cooperation with the wireless assistant terminal described above. The wireless control terminal includes an accommodation portion for accommodating the wireless assistant terminal so as to allow exchange of information between the wireless control terminal and the wireless assistant terminal such that they can work in cooperation. The accommodation portion may be provided to accommodate the wireless assistant terminal within the wireless control terminal or accommodate the wireless assistant terminal by attaching the wireless assistant terminal to the external surface of the wireless control terminal.

Also, the wireless control terminal includes an emergency stop control portion, and at least control regarding emergency stop for the control target is performed by the emergency stop control portion via a predetermined wireless scheme of the wireless control terminal. The predetermined wireless scheme is a wireless scheme used independently of the predetermined control wireless scheme of the wireless assistant terminal. Accordingly, at least two wireless paths are formed in the wireless control apparatus composed of a wireless assistant terminal and a wireless control terminal. As a result of a plurality of wireless paths being formed as described above, it is possible to separately transmit instructions for different controls to the control apparatus.

The predetermined control wireless scheme of the wireless assistant terminal may be the same as the predetermined wireless scheme of the wireless control terminal, or may be different. That is, the predetermined wireless scheme of the wireless control terminal may be a predetermined emergency stop wireless scheme that is different from the predetermined control wireless scheme. In particular, it is preferable that the emergency stop wireless scheme is a wireless scheme that implements the functions required from the viewpoint of security standards when performing emergency stop of the control target. For example, as the predetermined emergency stop wireless scheme, a wireless scheme according to IEC 62745 can be used. With this configuration, in the wireless control apparatus composed of a wireless control terminal and a wireless assistant terminal, at least a control instruction regarding emergency stop transmitted by the wireless control terminal in accordance with the predetermined emergency stop wireless scheme and a control instruction transmitted by the wireless assistant terminal in accordance with the predetermined control wireless scheme are transmitted to the control apparatus separately in parallel. Consequently, it can be said that a configuration that contributes to ensuring reliability as the wireless control apparatus is achieved.

In order to implement control of emergency stop in the wireless control terminal, the power supplied from the wireless control terminal-side battery is used. In other words, the control of emergency stop by the emergency stop control portion is performed in a normal manner as long as there is sufficient power in the wireless control terminal-side battery. However, if the remaining amount of storage power in the battery becomes insufficient, the control of emergency stop by the emergency stop control portion is not ensured, and the wireless control terminal is in a state in which it is difficult to perform normal control of the control target and perform emergency stop control in a normal manner (hereinafter referred to as "less controllable state"). Accordingly, in the wireless control terminal according to the present invention, the output portion outputs remaining storage power information regarding the remaining amount of storage power in the wireless control terminal-side battery to a notification apparatus. The notification apparatus is an apparatus provided in the wireless control terminal or the wireless assistant terminal so as to notify the operator of information. With this configuration, the operator can recognize how much power is left in the wireless control terminal-side battery according to the content of the notification provided by the notification apparatus, and it is therefore possible to avoid unexpected occurrence of the less controllable state caused by insufficient power.

The notification apparatus can provide a notification to the operator in any form as long as the operator can recognize the content of the notification through one of his/her five senses. As the form of notification, for example, providing a display on a display device or an alert by sound or flashing a lamp can be used. The notification apparatus may be provided in either one or both of the wireless control terminal and the wireless assistant terminal as long as it is provided in the wireless control apparatus composed of the wireless control terminal and the wireless assistant terminal, and the number of notification apparatuses may be one or more.

Also, in the wireless control terminal described above, information regarding a remaining amount of storage power in the battery of the wireless assistant terminal may be further output to the notification apparatus from the wireless assistant terminal. Since both of the information regarding the remaining amount of storage power in the wireless control terminal-side battery and the information regarding the remaining amount of storage power in the wireless assistant terminal-side battery are output to the notification apparatus, the operator can appropriately recognize the remaining amounts of storage power in the terminals. Accordingly, it is possible to prevent either one of the terminals from unexpectedly running out of power.

Here, in the wireless control terminal described above, the emergency stop control portion may be configured to perform emergency stop of the control target if a predetermined signal transmitted intermittently or regularly to the control apparatus with supply of power from the wireless control terminal-side battery by using the predetermined wireless scheme of the wireless control terminal is interrupted. This configuration shows an example of emergency stop control by the emergency stop control portion. The wireless control terminal including the emergency stop control portion configured as described above cannot transmit the predetermined signal if the remaining amount of storage power in the wireless control terminal-side battery becomes insufficient. This state can be regarded as the same as when the transmission of the predetermined signal is interrupted, and thus as a result, the wireless control terminal is brought into a state in which emergency stop of the control target is unintentionally performed by the remaining amount of storage power being lowered, or in other words, the wireless control terminal is brought into the less controllable state. Accordingly, as described above, by the output portion outputting the remaining storage power information to the notification apparatus, it is possible to inform the operator of the remaining amount of storage power and prevent a situation in which emergency stop of the control target is performed unexpectedly for the operator.

As another configuration of the emergency stop control portion, the emergency stop control portion may be configured to transmit a signal for performing emergency stop of the control target to the control apparatus. The wireless control terminal including the emergency stop control portion configured as described above cannot transmit the emergency stop signal if the remaining amount of storage power in the wireless control terminal-side battery becomes insufficient, and thus the wireless control terminal is brought into a state in which the operator cannot intentionally perform emergency stop of the control target, or in other words, as described above, the wireless control terminal is brought into the less controllable state. Accordingly, as described above, by the output portion outputting the remaining storage power information to the notification apparatus, it is possible to inform the operator of the remaining amount of storage power and prevent a situation in which emergency stop of the control target is performed unexpectedly for the operator.

Also, the wireless control terminal described above may further include a power receiving portion that receives supply of power from the battery of the wireless assistant terminal if the remaining amount of storage power in the wireless control terminal-side battery is less than or equal to a predetermined value. In this case, the output portion incorporates power supply information in the remaining storage power information and outputs the remaining storage power information to the notification apparatus, the power supply information indicating that the supply of power from the battery of the wireless assistant terminal is received by the power receiving portion. As a result of the wireless control terminal receiving supply of power from the wireless assistant terminal by the power receiving portion, the occurrence of the less controllable state caused by the remaining amount of storage power in the wireless control terminal-side battery being lowered can be avoided. On the other hand, there is also a limit to the amount of power stored in the wireless assistant terminal-side battery, and thus the power receiving portion cannot receive supply of power for a long period of time. Accordingly, by the output portion outputting the remaining storage power information so as to notify the operator of the fact that power is being received by the power receiving portion, it is possible to prompt the operator to take measures for avoiding the less controllable state such as, for example, charging the wireless control terminal-side battery, or avoiding emergency stop of the control target (for example, performing intentional stop of the control target).

The configuration described above does not exclude a configuration in which the wireless assistant terminal receives power from the wireless control terminal. For example, in the case where there is relatively enough remaining amount of storage power in the wireless control terminal-side battery, if the remaining amount of storage power in the wireless assistant terminal-side battery lowers, the surplus of power needed in the wireless control terminal or the like may be supplied to the wireless assistant terminal-side battery. However, if the control target is wirelessly controlled without the operator knowing the fact, as a result of power being continuously discharged from the wireless control terminal-side battery without the operator knowing the fact, the wireless control terminal may be unexpectedly brought into the less controllable state. To address this, when power is supplied from the wireless control terminal-side battery to wireless assistant terminal-side battery, the output portion preferably incorporates power supply information indicating the state of power supply in the above-described remaining storage power information, and outputs the remaining storage power information to the notification apparatus.

Here, in the wireless control terminal described above, the output portion may incorporate information regarding a remaining operation time in the remaining storage power information together with the power supply information and output the remaining storage power information to the notification apparatus, the remaining operation time being the remaining time for which the wireless control terminal can perform operations. With this configuration, it is possible to notify the operator of the time taken until the less controllable state in which it is difficult to control the control target occurs. As a result, the operator can easily take measures for avoiding the less controllable state. Particularly when power is received by the power receiving portion from the wireless assistant terminal-side battery, there is relatively little remaining amount of storage power in the wireless control terminal-side battery. Accordingly, it is very helpful to notify the operator of how long the wireless control terminal that is receiving power from the wireless assistant terminal as described above can perform operations, or in other words, the remaining operation time, which is the time taken until the less controllable state in which it is difficult to control the control target occurs while receiving supply of power from the outside. A calculating portion for calculating the remaining operation time may be provided in the wireless control terminal or the wireless assistant terminal.

As an example of the notification apparatus described above, the notification apparatus may be a display apparatus provided in the wireless assistant terminal. In this case, the output portion transmits the remaining storage power information to the wireless assistant terminal and causes the remaining storage power information to be displayed on the display apparatus. In order to notify the operator of the remaining storage power information as described above, the existing display apparatus of the wireless assistant terminal may be used. Alternatively, as another method, the existing display apparatus or the like of the wireless control terminal may be used.

Also, an aspect of the present invention may be an emergency stop control program that causes a wireless control terminal to execute the processing comprising the following steps, the wireless control terminal being configured to control a control target connected to a control apparatus by working in cooperation with a wireless assistant terminal capable of transmitting a predetermined control instruction for controlling the control target to the control apparatus by using a predetermined control wireless scheme with supply of power from a battery included in the wireless assistant terminal. In this case, the emergency stop control program causes the wireless control terminal to execute the steps of; placing the wireless control terminal in a state of being capable of performing electrical exchange of information with the wireless assistant terminal when the wireless assistant terminal is accommodated in an accommodation portion for accommodating the wireless assistant terminal; performing, on the control apparatus, control regarding emergency stop of the control target by using a predetermined wireless scheme of the wireless control terminal with supply of power from a wireless control terminal-side battery disposed within the wireless control terminal; and outputting at least remaining storage power information regarding a remaining amount of storage power in the wireless control terminal-side battery to a notification apparatus provided in the wireless control terminal or the wireless assistant terminal. The technical ideas disclosed in connection with the wireless control terminal of the invention described above can be applied to the emergency stop control program according to the invention as long as there is no technical inconsistency.

Effects of the Invention

The present invention can prevent an influence caused by insufficient driving power in a wireless control apparatus for controlling a control target such as an industrial robot, the wireless control apparatus including a wireless assistant terminal.

EMBODIMENTS OF THE INVENTION

A wireless control terminal 10 according to the present invention and a teach pendant 1 including the wireless control terminal 10 will be described mainly with reference to the drawings. It should be noted that the configuration described in the following embodiment is merely an example, and the present invention is not limited to the configuration of the embodiment.

Embodiment 1

Figure 1:
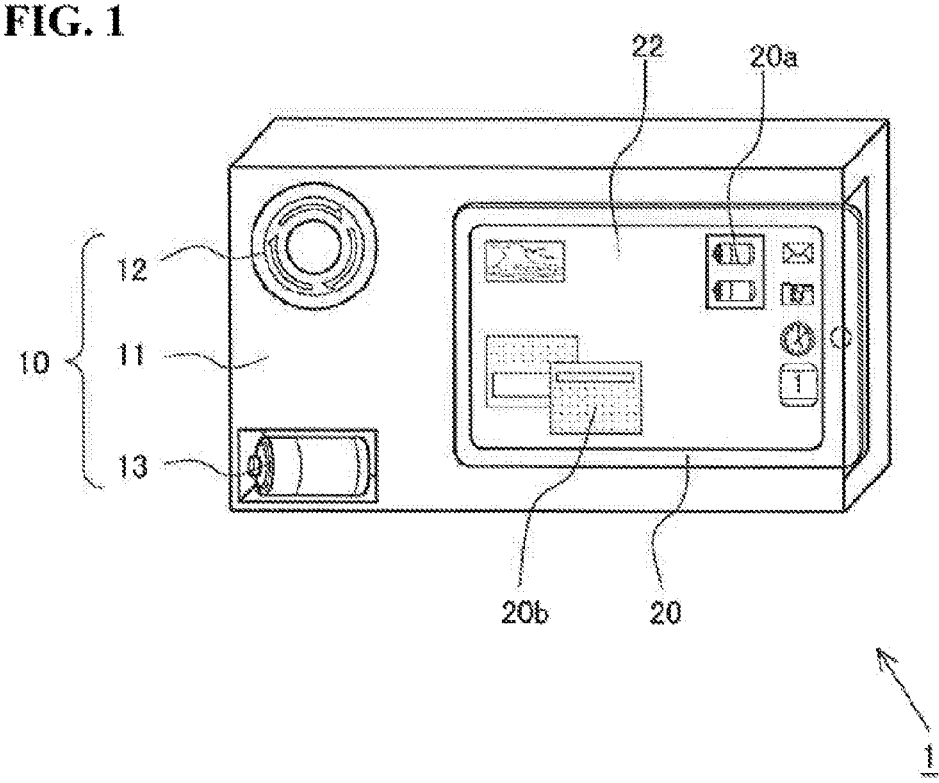
FIG. 1 is a diagram showing a schematic configuration of a wireless control apparatus formed by attaching a wireless assistant terminal within a wireless control terminal.
Figure 2:
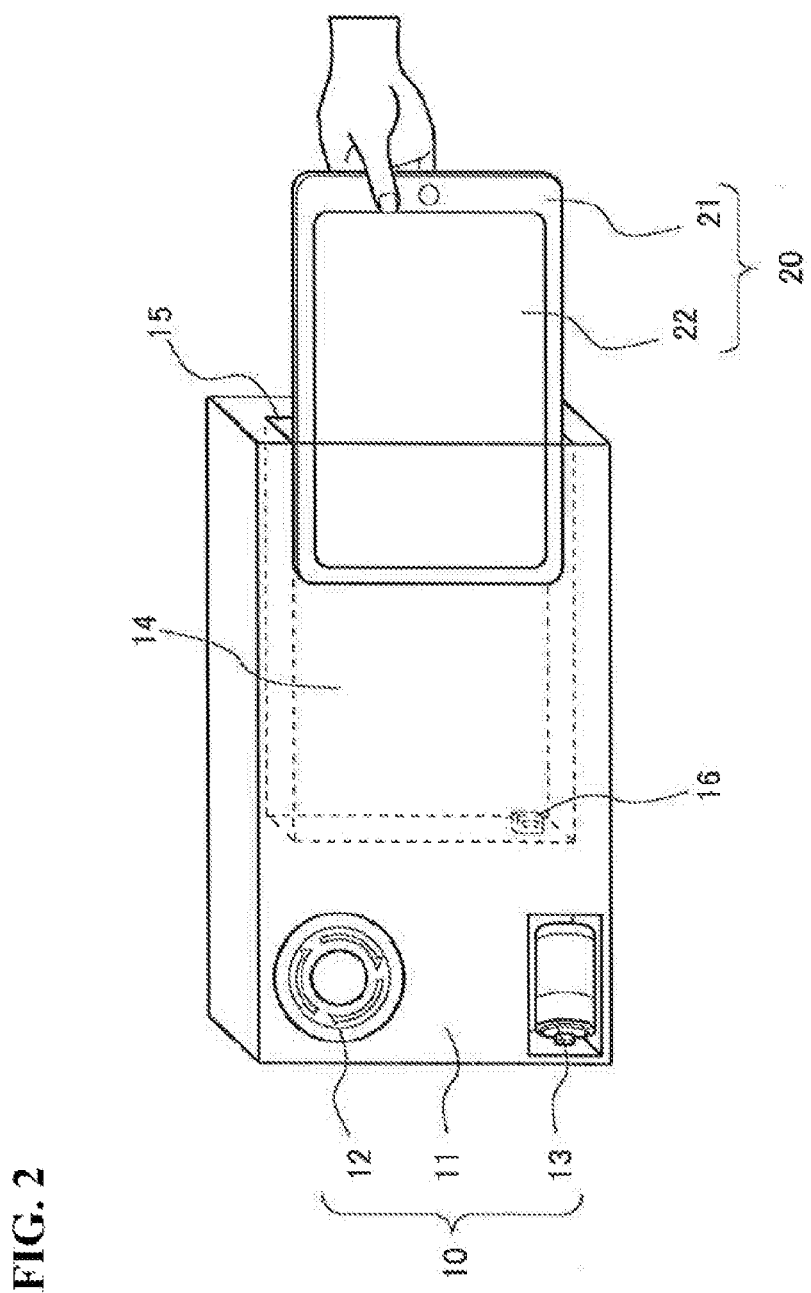
FIG. 2 is a diagram showing the wireless control apparatus when the wireless assistant terminal is attached within the wireless control terminal.
Figure 3:
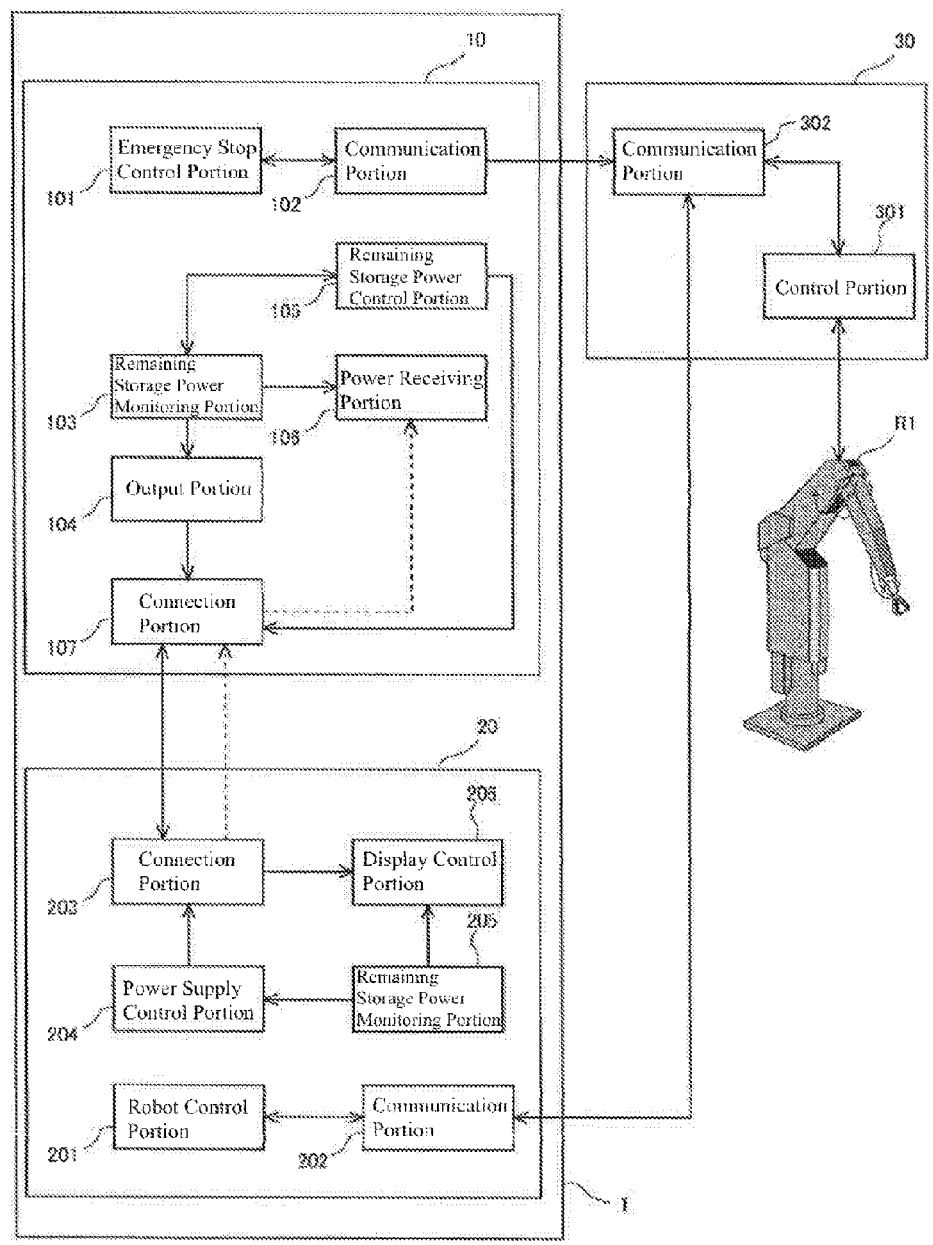
FIG. 3 is a functional block diagram of a control apparatus that is connected to the wireless control terminal, the wireless assistant terminal and an industrial robot.

FIG. 1 shows a schematic configuration of a teach pendant 1 that is a wireless control apparatus according to the present invention, the teach pendant including two wireless terminals, namely, a wireless control terminal 10 and a wireless assistant terminal 20. FIG. 2 shows a state in which the wireless assistant terminal 20 is accommodated into the wireless control terminal 10 when forming the teach pendant 1. As shown in FIG. 3, which will be described later, the teach pendant 1 is an apparatus that allows an operator to operate an industrial robot R1 in a cableless state by wirelessly transmitting an operation instruction and an emergency stop instruction to a control apparatus 30 for controlling the industrial robot R1, the control apparatus 30 being connected to the industrial robot R1 with a cable. The control apparatus 30 is installed stationary near the industrial robot R1, and the control apparatus 30 is internally provided with a power supply apparatus for supplying power required to drive actuators provided in the industrial robot R1, an amplifier and the like. Accordingly, it can be said that the teach pendant 1 is a control apparatus that issues an instruction to the power supply apparatus and the like of the control apparatus 30.

Here, the wireless assistant terminal 20 constituting the teach pendant 1 is a tablet terminal universally used in recent years, and will be hereinafter also referred to as "tablet terminal 20". The tablet terminal 20 is internally provided with a computation device, a memory and the like, and performs various functions by a predetermined computer program being executed by the computation device. The functions of the tablet terminal 20 will be described later. Also, the tablet terminal 20 includes a touch panel display 22 on its terminal body 21. The driving power for driving the tablet terminal 20 configured as described above, or in other words, the driving power required to execute the above-described control program and provide a display on the display 22 is supplied from a battery provided within the tablet terminal 20 (hereinafter also referred to as "tablet terminal-side battery"). The tablet terminal-side battery can increase the remaining amount of power stored in the battery by charging from an external power source, but otherwise has a limited amount of power stored therein.

Also, in the wireless control terminal 10, an accommodation space 14 in which the tablet terminal 20 is accommodated is formed within a terminal body 11, and the tablet terminal 20 is inserted from an opening 15 of the accommodation space 14. A USB connector 16 of the wireless control terminal 10 is provided on the bottom side of the accommodation space 14, and the USB connector 16 is positioned within the accommodation space 14 so as to engage with a connector of the tablet terminal 20 inserted into the accommodation space 14 via the opening 15. Furthermore, in the wireless control terminal 10, an emergency stop button 12 that issues an emergency stop instruction to the industrial robot R1 that is a control target is provided on the front surface of the terminal body 11. The emergency stop preferably conforms to predetermined standards, for example, ISO 13850 in order to ensure the security of the operator. The wireless control terminal 10 is also internally provided with a computation device, a memory and the like, and performs various functions by a predetermined control program being executed by the computation device. The functions of the wireless control terminal 10 will also be described later.

The driving power for driving the wireless control terminal 10, or in other words, the driving power mainly required to perform emergency stop control of the industrial robot R1 is in principle supplied from a battery 13 provided within the wireless control terminal 10. The battery 13 of the wireless control terminal can also increase the remaining amount of storage power in the battery by charging from an external power source, but otherwise has a limited amount power stored therein, as with the tablet terminal-side battery.

As described above, in the teach pendant 1, the tablet terminal 20 in which a control program for operating the industrial robot R1 is executed is attached within the wireless control terminal 10 that mainly takes charge of emergency stop control of the industrial robot R1, and as a result of the wireless control terminal 10 and the tablet terminal 20 working in cooperation, all of the functions of the teach pendant 1 are implemented. FIG. 3 is a functional block diagram showing a part of various functions of the wireless control terminal 10 and the tablet terminal 20 when the wireless control terminal 10 and the tablet terminal 20 are electrically connected via the USB connector 16 and are in a state in which they are ready to work in cooperation (the state shown in FIG. 1) in the teach pendant 1. FIG. 3 also briefly shows the functional blocks of the stationary control apparatus 30 to which the industrial robot R1 is connected.

The wireless control terminal 10 includes, as functional portions, an emergency stop control portion 101, a communication portion 102, a remaining storage power monitoring portion 103, an output portion 104, a remaining storage power control portion 105, a power receiving portion 106 and a connection portion 107. The emergency stop control portion 101 is a functional portion that takes charge of emergency stop control of the industrial robot 30 performed between the teach pendant 1 and the control apparatus 30. To be specific, the emergency stop control portion 30 regularly transmits a predetermined signal from the wireless control terminal 10 to the control apparatus 30 via the communication portion 102, which will be described later, during normal operation. The predetermined signal is a signal for the control apparatus 30 to interpret that the industrial robot R1 is in a normal state if the signal regularly reaches the control apparatus 30. Then, when the operator presses the emergency stop button 12, the transmission of the predetermined signal is interrupted. As a result of the predetermined signal no longer reaching the control apparatus 30, the control apparatus 30 interprets that the industrial robot R1 is in an emergency state, and emergency stop of the industrial robot R1 is executed by a control portion 301 provided in the control apparatus 30, which will be described later.

Here, the communication portion 102 is a functional portion that takes charge of transmission of a signal for emergency stop by the emergency stop control portion 101 by using an unshown antenna provided in the wireless control terminal 10, and as described above, the predetermined signal for emergency stop control is transmitted to a communication portion 302 provided in the control apparatus 30, which will be described later, by the communication portion 102. The emergency stop control of the industrial robot R1 is closely related to the security of the operator, and thus the wireless scheme used by the communication portion 102 is preferably a wireless scheme conforming to the standards (IEC 62745) for the security of machinery that performs cableless control.

Next, the remaining storage power monitoring portion 103 is a functional portion that monitors the remaining amount of storage power in the battery 13 in the wireless control terminal 10. Then, information (remaining storage power information) regarding the remaining amount of storage power in the battery 13 acquired by the remaining storage power monitoring portion 103 is output to the tablet terminal 20 via the connection portion 107 by the output portion 104. The information output by the output portion 104 as the remaining storage power information is not limited to the information regarding the remaining amount of storage power in the battery 13, and information regarding a state of power supply from the tablet terminal 20, which will be described later, and information regarding the remaining operation time of the battery 13 during which the battery 13 is available in the state of power supply are also output.

Also, the remaining storage power control portion 105 is a functional portion that controls supply of power from the tablet terminal 20 according to the remaining amount of storage power in the battery 13. The remaining storage power control portion 105 issues a power supply request to the tablet terminal 20 via the connection portion 107, and supply of power to the wireless control terminal 10 initiated in response to receiving the power supply request is received by the power receiving portion 106 via the connection portion 107. The power received by the power receiving portion 106 is stored in the battery 13. The connection portion 107 is a connection portion of the wireless control terminal 10 formed via the USB connector 16, and enables, in addition to electrical exchange of information between the wireless control terminal 10 and the tablet terminal 20, supply of power from the tablet terminal 20 to the wireless control terminal 10.

Next, the functional portions of the tablet terminal 20 will be described. The tablet terminal 20 includes, as functional portions, a robot control portion 201, a communication portion 202, a connection portion 203, a power supply control portion 204, a remaining storage power monitoring portion 205 and a display control portion 206. The robot control portion 201 is formed by a predetermined control program (for example, a program for teaching the industrial robot R1) executed in the tablet terminal 20 being executed. Upon execution of the predetermined control program, as shown in FIG. 1, a window 20b for the predetermined control program is displayed on the display 22, and when the operator performs a predetermined operation on the window, a predetermined control instruction for the industrial robot R1, the predetermined control instruction corresponding to the predetermined operation, is generated by the robot control portion 201. Then, the predetermined control instruction is transmitted to the communication portion 302 of the control apparatus 30 via the communication portion 202, and after that, the control portion 301 drives the industrial robot R1 in accordance with the predetermined control instruction.

The communication portion 202 is a functional portion that takes charge of transmission of a predetermined control instruction by the robot control portion 201 and reception of a predetermined signal (for example, positional information of the actuators of the joints of the industrial robot, or the like) transmitted from the industrial robot R1 by using an unshown antenna provided in the tablet terminal 20. With respect to the signal and information, the need to consider the security of the operator is assumed to be lower than with respect to the emergency stop instruction described above. Accordingly, the wireless scheme used by the communication portion 202 does not necessarily conform to specific security standards and may be different from that used by the communication portion 102. A wireless scheme according to the universally used Wi-Fi standards may be used. In general, many of the universally used table terminals use some sort of Wi-Fi standards, and thus a communication functional portion supporting a wireless scheme already set in the tablet terminal 20 may be used in place of the communication portion 202.

Next, the connection portion 203 is a connection portion of the tablet terminal 20 formed via the USB connector 16, and enables, in addition to electrical exchange of information between the wireless control terminal 10 and the tablet terminal 20, as described above, supply of power from the tablet terminal 20 to the wireless control terminal 10. The power supply control portion 204 is a functional portion that controls supply of power from the battery provided in the tablet terminal 20 to the wireless control terminal 10 in response to a power supply request from the remaining storage power control portion 105 described above. The remaining storage power monitoring portion 205 is a functional portion that monitors the remaining amount of storage power in the battery provided in the tablet terminal 20. Information regarding the remaining amount of storage power acquired by the remaining storage power monitoring portion 205 is sent to the display control portion 206, which will be described later.

The display control portion 206 is a functional portion that causes the remaining storage power information output by the output portion 104 provided in the wireless control terminal 10 and the information regarding the remaining amount of storage power in the battery provided in the tablet terminal 20 acquired by the remaining storage power monitoring portion 205 of the tablet terminal 20 to be displayed on the display 22 of the tablet terminal 20. In FIG. 1, the information is displayed in a region indicated by reference numeral 20a. Details of the form of display will be described later.

The control apparatus 30 connected to the industrial robot 30 includes a control portion 301 and a communication portion 302. The communication portion 302 is a functional portion that takes charge of transmission and reception of various types of signals and information with the communication portion 102 of the wireless control terminal 10 and the communication portion 202 of the tablet terminal 20. As described above, since the communication portion 102 and the communication portion 202 use different wireless schemes, the communication portion 302 is configured so as to support their wireless schemes. Various types of signals and information delivered to the control apparatus 30 via the communication portion 302 are used by the control portion 301 to drive the industrial robot R1, perform emergency stop, and the like.

Figure 4:
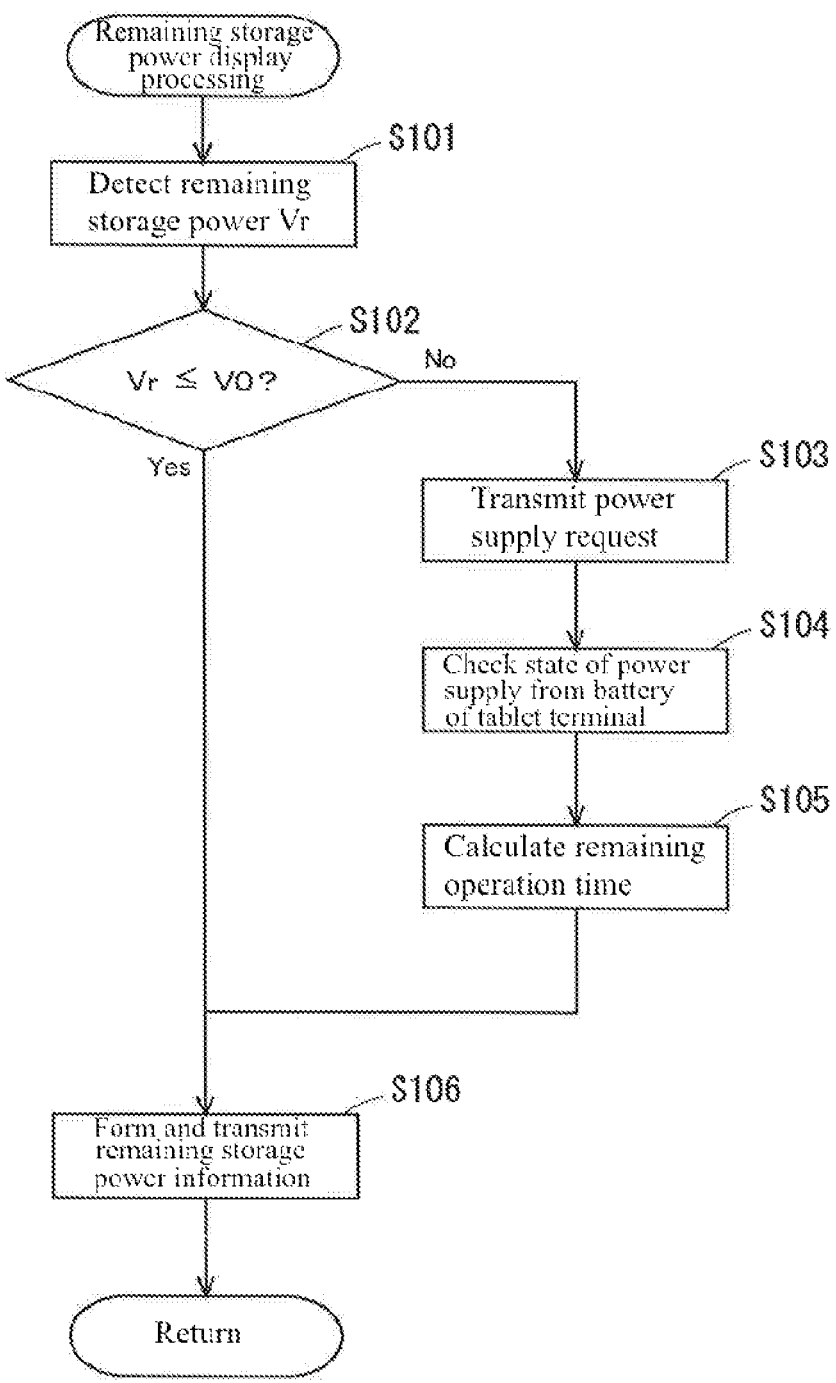
FIG. 4 is a flowchart of remaining storage power display processing executed in the wireless control terminal.
Figure 5:
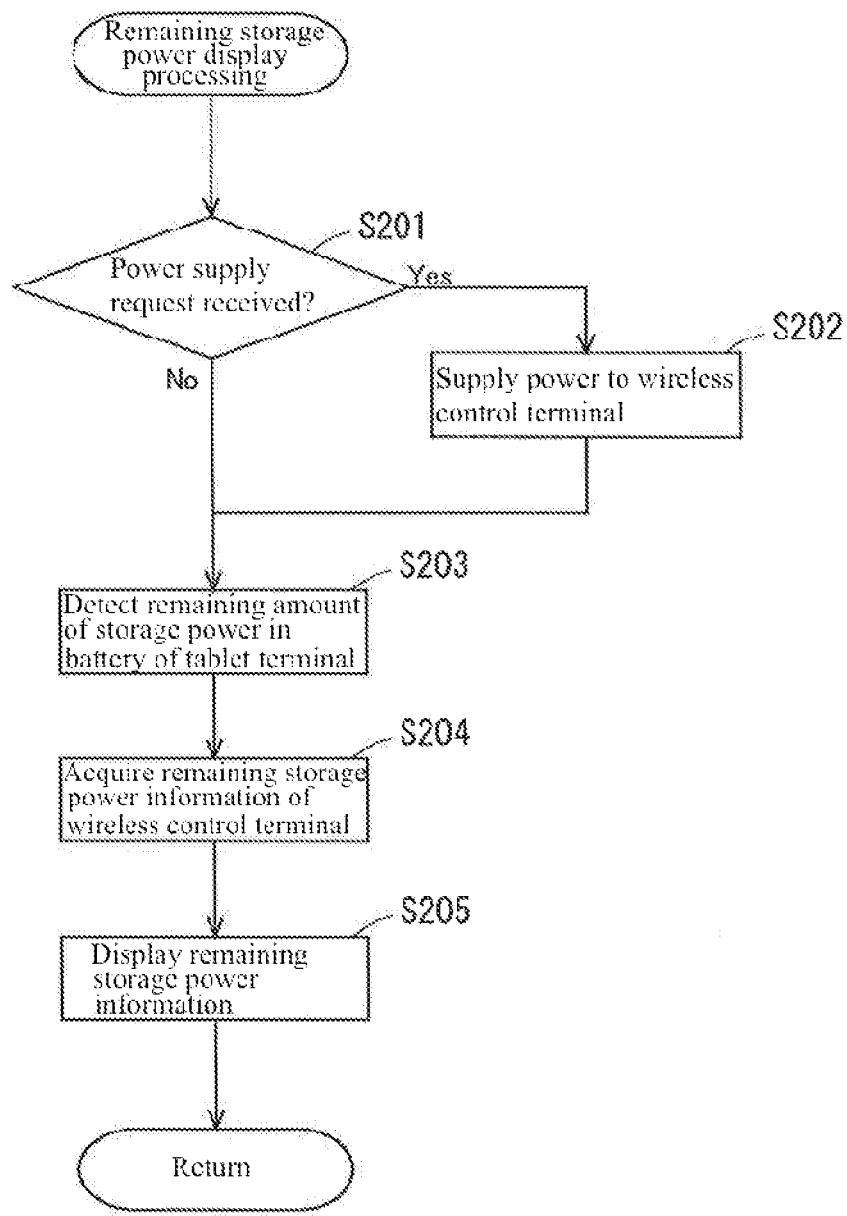
FIG. 5 is a flowchart of remaining storage power display processing executed in the wireless assistant terminal.

A description of remaining storage power display processing executed in the teach pendant 1 configured to control the industrial robot R1 will be given. The remaining storage power display processing is repeatedly executed by each of the wireless control terminal 10 and the tablet terminal 20 while the teach pendant 1 is performing some kind of control on the industrial robot R1. FIG. 4 shows a flow of the remaining storage power display processing executed in the wireless control terminal 10, and FIG. 5 shows a flow of the remaining storage power display processing executed in the tablet terminal 20.

The remaining storage power display processing shown in FIG. 4 executed in the wireless control terminal 10 will be described first. In S101, remaining storage power Vr in the battery 13 is detected by the remaining storage power monitoring portion 103. To be specific, the remaining storage power Vr is calculated based on inter-terminal voltage of the battery 13. Upon completion of the processing of S101, the process advances to S102. In S102, it is determined whether or not the remaining storage power Vr detected in S101 is less than or equal to a predetermined reference value of V0. The predetermined reference value of V0 is a threshold value used to determine whether or not to supply power to the battery 13 from the battery provided in the tablet terminal 20 so as to make it less likely to cause a less controllable state caused by the remaining amount of storage power in the battery being lowered. As the predetermined reference value of V0, for example, a value corresponding to 50% of the remaining amount of storage power when the battery 13 is fully charged may be set. It is also possible to set any other value. If an affirmative determination is made in S102, the process advances to S106. If a negative determination is made, the processing of steps S103 to S105 is performed, and then the process advances to S106. The processing of steps S102 to S105 is performed by the remaining storage power control portion 105.

Next, in S103, since it has been determined that the remaining amount of storage power in the battery 13 is less than or equal to a predetermined reference value of V0, a power supply request for supply of power from the tablet terminal 20 is transmitted to the tablet terminal 20. Then, in S104, the state of power supply from the tablet terminal 20 that has received the power supply request is checked. To be specific, it is checked whether the supply of power from the tablet terminal 20 is received by the power receiving portion 106 or the supply of power from the tablet terminal 20 is not performed irrespective of the power supply request being transmitted.

Next, in S105, the remaining operation time of the wireless control terminal 10 is calculated, the remaining operation time indicating how long the battery 13 of the wireless control terminal 10 can supply power in the current state of power supply by the tablet terminal 20, or in other words, how long emergency stop control performed by the emergency stop control portion 101 can continue in a normal manner in the wireless control terminal 10. To be specific, the remaining operation time can be calculated by dividing a total of the remaining amount of storage power in the battery 13, which is acquired by the remaining storage power monitoring portion 103, and the remaining amount of storage power in the battery provided in the tablet terminal 20 serving as a source of power supply, which is acquired by the remaining storage power monitoring portion 205, by the power consumption per unit time required to continue the emergency stop control performed by the emergency stop control portion 101.

Then, in S106, remaining storage power information is formed by the output portion 104, and the information is transmitted to the tablet terminal 20. The remaining storage power information includes the information regarding the remaining amount of storage power in the battery 13 detected in S101, the information regarding the state of power supply from the tablet terminal 20 checked in S104, and the information regarding the remaining operation time calculated in S105. The transmitted remaining storage power information is subjected to display processing performed by the display control portion 206 of the tablet terminal 20.

Next, the remaining storage power display processing shown in FIG. 5 executed in the tablet terminal 20 will be described. First, in S201, it is determined whether or not a power supply request has been received from the wireless control terminal 10. If an affirmative determination is made in S201, the process advances to S202. If a negative determination is made, the process advances to S203. Then, in S202, power is supplied to the battery 13 from the battery provided in the tablet terminal 20. The processing of steps S201 and S202 is performed by the power supply control portion 204. In the processing of S202, a selection window for selecting whether or not supply of power from the tablet terminal 20 should be performed may be displayed on the display 22 for the operator so as to cause the operator to make a selection. If it is determined that supply of power from the tablet terminal 20 should be performed, the processing of S202 is performed. If it is determined that supply of power from the tablet terminal 20 should not be performed, the processing of S203 and subsequent steps is performed without the processing of S202 being performed. In the case where the latter determination is made, in the processing of S104 shown in FIG. 4, it is confirmed that "the supply of power from the tablet terminal 20 is not performed irrespective of the power supply request being transmitted".

Next, in S203, the remaining amount of storage power in the battery provided in the tablet terminal 20 is detected by the remaining storage power monitoring portion 205. Next, in S204, the remaining storage power information transmitted from the output portion 104 of the wireless control terminal 10 is acquired, and thereafter, in S205, the remaining storage power information is displayed on the display 22 of the tablet terminal 20 by the display control portion 206. To be specific, as shown in the region 20a in FIG. 1, the remaining storage power information is displayed such that an indicator in the form of a battery for the battery 13 of the wireless control terminal 10 and an indicator in the form of a battery for the battery of the tablet terminal 20 are laid out, and each indicator is filled as the remaining amount of power in the battery increases. In this case, as the remaining amount of storage power in the battery becomes lower, a white region in the corresponding battery indicator is broadened, and thus the operator can easily recognize the remaining amount of storage power in each battery by viewing the state of the indicator.

Also, in the region 20a of the display 22, in addition to the state of the remaining amount of storage power, the information regarding the state of power supply from the tablet terminal 20 checked in S104 and the information regarding the remaining operation time calculated in S105 that are incorporated in the remaining storage power information transmitted by the output portion 104 are also displayed. For example, a message "power is currently supplied" is displayed in the region 20a so that the operator can recognize the fact that the wireless control terminal 10 is receiving supply of power from the tablet terminal 20, and at the same time, the remaining operation time while power is supplied is displayed next to the battery indicator. As the form of display, a form of display other than the above may be used.

As described above, as a result of the remaining storage power information being displayed on the display 22 of the tablet terminal 20 accommodated in the teach pendant 1 while the teach pendant 1 is in operation, the operator can easily recognize, in particular, how much time is left for the wireless control terminal 10 that takes charge of emergency stop control of the industrial robot R1 to run out of the driving power. Consequently, it is possible to prompt the operator to take precautionary actions and prevent the occurrence of the emergency stop of the industrial robot R1 caused by the driving power being lowered.

The embodiment described above is configured such that the remaining operation time is calculated in the wireless control terminal 10 in S105, but instead, the remaining operation time may be calculated in the tablet terminal 20. In this case, the tablet terminal 20 may be configured to receive the remaining amount of storage power in the battery 13, which is acquired by the remaining storage power monitoring portion 103, and calculate the remaining operation time by dividing a total of the remaining amount of storage power in the battery 13 and the remaining amount of storage power in the battery of the tablet terminal 20, which is acquired by the remaining storage power monitoring portion 205, by the power consumption per unit time required to continue the emergency stop control performed by the emergency stop control portion 101.

Variation 1

The embodiment described above is configured such that the remaining storage power information is displayed on the display 22 of the tablet terminal 20. However, in the case where a display apparatus is provided in the wireless control terminal 10, the output portion 104 may output the remaining storage power information to the display apparatus and display the remaining storage power information on the display apparatus. Also, instead of displaying the remaining storage power information on the display 22, it is possible to use a configuration in which a plurality of LED lights provided in the wireless control terminal 10 or the tablet apparatus 20 are used and the number of LED lights illuminated is changed according to the remaining amount of storage power, so as to notify the operator of the content of the remaining storage power information. It is also possible to use a configuration in which a buzzer (speaker) provided in the wireless control terminal 10 or the tablet apparatus 20 is used and the sound from the buzzer is changed according to the remaining amount of storage power, so as to notify the operator of the content of the remaining storage power information.

Variation 2

The embodiment described above is configured such that, in order to avoid unexpected emergency stop of the industrial robot R1 caused by the remaining amount of storage power in the battery 13 being lowered and the predetermined signal transmitted regularly from the emergency stop control portion 101 being interrupted, the remaining storage power information is displayed on the display 22 of the tablet terminal 20. In this variation, as another configuration of the emergency stop control portion 101 involved in the emergency stop of the industrial robot R1, the emergency stop control portion 101 may be configured to transmit an emergency stop signal for urgently stopping the industrial robot R1 to the control apparatus via the communication portion 102 by using an operation of pressing the emergency stop button 12 by the operator as a trigger. In this case, when the remaining amount of storage power in the battery is lowered, it is difficult to transmit the emergency stop signal, and as a result, emergency stop of the industrial robot R1 cannot be performed intentionally. Accordingly, even in such a situation, by displaying the remaining storage power information on the display 22 of the tablet terminal 20, it is possible to alert the operator.

Variation 3

Also, the embodiment described above is configured such that power is supplied from the battery provided in the tablet terminal 20 to the battery 13, but power may be supplied from the battery 13 to the battery provided in the tablet terminal 20 according to the states of the remaining amounts of storage power in the battery 13 and the battery provided in the tablet terminal 20. In this case, it is considered that there is enough remaining amount of storage power in the battery 13, but continuous discharge from the battery 13 will affect the operations of the wireless control terminal 10, making it difficult to perform control regarding emergency stop of the industrial robot R1 in a preferable manner. Accordingly, when power is supplied in the manner as described above as well, it is preferable to incorporate information indicating the state of power supply in the remaining storage power information, transmit the remaining storage power information to the tablet terminal 20 and display the remaining storage power information on the display 22. Preferably, the state of power supply from the battery provided in the tablet terminal 20 to the battery 13, and the state of power supply from the battery 13 to the battery provided in the tablet terminal 20 are displayed in a distinguished manner on the display 22. The states of power supply can be displayed in a distinguished manner by, for example, changing the color of the displayed message "power is currently supplied".

INDEX TO THE REFERENCE NUMERALS

1 . . . wireless control apparatus
10 . . . wireless control terminal
12 . . . emergency stop button
13 . . . battery
14 . . . accommodation portion
20 . . . tablet terminal
22 . . . display
R1 . . . industrial robot

The invention claimed is:

1. A wireless control terminal configured to control a control target connected to a control apparatus by working in cooperation with a wireless assistant terminal capable of transmitting a predetermined control instruction for controlling the control target to the control apparatus by using a predetermined control wireless scheme with supply of power from a battery included in the wireless assistant terminal, the wireless control terminal comprising:
an accommodation portion in which the wireless assistant terminal is accommodated, wherein the wireless assistant terminal and the wireless control terminal are placed in a state of being capable of performing electrical exchange of information with each other when the wireless assistant terminal is accommodated in the accommodation portion;
an emergency stop control portion that performs, on the control apparatus, control regarding emergency stop of the control target by using a predetermined wireless scheme of the wireless control terminal;
a wireless control terminal-side battery disposed within the wireless control terminal so as to supply driving power required to drive at least the emergency stop control portion in the wireless control terminal; and
an output portion that outputs at least remaining storage power information regarding a remaining amount of storage power in the wireless control terminal-side battery to a notification apparatus provided in the wireless control terminal or the wireless assistant terminal.

2. The wireless control terminal according to claim 1, wherein the predetermined wireless scheme of the wireless control terminal is a predetermined emergency stop wireless scheme that is different from the predetermined control wireless scheme.

3. The wireless control terminal according to claim 1, wherein information regarding a remaining amount of storage power in the battery of the wireless assistant terminal is further output to the notification apparatus from the wireless assistant terminal.

4. The wireless control terminal according to claim 1, wherein the emergency stop control portion is configured to perform emergency stop of the control target if a predetermined signal transmitted intermittently or regularly to the control apparatus with supply of power from the wireless control terminal-side battery by using the predetermined wireless scheme of the wireless control terminal is interrupted.

5. The wireless control terminal according to claim 1, further comprising a power receiving portion that receives supply of power from the battery of the wireless assistant terminal if the remaining amount of storage power in the wireless control terminal-side battery is less than or equal to a predetermined value,
wherein the output portion incorporates power supply information in the remaining storage power information and outputs the remaining storage power information to the notification apparatus, the power supply information indicating that the supply of power from the battery of the wireless assistant terminal is received by the power receiving portion.

6. The wireless control terminal according to claim 1, wherein the output portion incorporates information regarding a remaining operation time in the remaining storage power information together with the power supply information and outputs the remaining storage power information to the notification apparatus, the remaining operation time being the remaining time for which the wireless control terminal can perform operations.

7. The wireless control terminal according to claim 1, wherein the notification apparatus is a display apparatus included in the wireless assistant terminal, and
the output portion transmits the remaining storage power information to the wireless assistant terminal and causes the remaining storage power information to be displayed on the display apparatus.

8. A wireless control apparatus for controlling a control target comprising:
an wireless assistant terminal capable of transmitting a predetermined control instruction for controlling a control target connected to a control apparatus to the control apparatus by using a predetermined control wireless scheme with supply of power from a battery included in the wireless assistant terminal; and
a wireless control terminal configured to control the control target by working in cooperation with the wireless assistant terminal,
wherein the wireless control terminal comprises:

an accommodation portion in which the wireless assistant terminal is accommodated, wherein the wireless assistant terminal and the wireless control terminal are placed in a state of being capable of performing electrical exchange of information with each other when the wireless assistant terminal is accommodated in the accommodation portion;

an emergency stop control portion that performs, on the control apparatus, control regarding emergency stop of the control target by using a predetermined wireless scheme of the wireless control terminal;

a wireless control terminal-side battery disposed within the wireless control terminal so as to supply driving power required to drive at least the emergency stop control portion in the wireless control terminal; and an output portion that outputs at least remaining storage power information regarding a remaining amount of storage power in the wireless control terminal-side battery to a notification apparatus provided in the wireless control terminal or the wireless assistant terminal.

9. An emergency stop control program for causing a wireless control terminal to execute the following steps of:

the wireless control terminal being configured to control a control target connected to a control apparatus by working in cooperation with a wireless assistant terminal capable of transmitting a predetermined control instruction for controlling the control target to the control apparatus by using a predetermined control wireless scheme with supply of power from a battery included in the wireless assistant terminal, placing the wireless control terminal in a state of being capable of performing electrical exchange of information with the wireless assistant terminal when the wireless assistant terminal is accommodated in an accommodation portion for accommodating the wireless assistant terminal;

performing, on the control apparatus, control regarding emergency stop of the control target by using a predetermined wireless scheme of the wireless control terminal with supply of power from a wireless control terminal-side battery disposed within the wireless control terminal; and outputting at least remaining storage power information regarding a remaining amount of storage power in the wireless control terminal-side battery to a notification apparatus provided in the wireless control terminal or the wireless assistant terminal.

* * * * *